(12) United States Patent
Dickelman

(10) Patent No.: US 6,529,187 B1
(45) Date of Patent: Mar. 4, 2003

(54) GENERALIZED SYSTEM FOR INTERNET AND SERVICES NAVIGATION FROM KEYPAD EQUIPPED INTERNET DEVICES, INCLUDING BROWSER EQUIPPED PHONES

(75) Inventor: Mark Dickelman, 311 W. Monroe St., Chicago, IL (US) 60606

(73) Assignee: Mark Dickelman, Chicago, IL (US)

(*) Notice: Subject to any disclaimer, the term of this patent is extended or adjusted under 35 U.S.C. 154(b) by 113 days.

(21) Appl. No.: 09/695,865

(22) Filed: Oct. 26, 2000

(51) Int. Cl.[7] .............................................. G06F 15/16
(52) U.S. Cl. ...................................... 345/169; 709/245
(58) Field of Search ................................ 345/169, 157, 345/184, 156; 707/10, 100, 245, 203; 709/245, 203

(56) References Cited

U.S. PATENT DOCUMENTS 6,292,172 B1 * 9/2001 Makhlouf .................... 345/157
6,378,234 B1 * 4/2002 Luo .............................. 341/22

FOREIGN PATENT DOCUMENTS

JP          10078928 A   *   3/1998   ........... G06F/13/00

* cited by examiner

Primary Examiner—Amare Mengistu
Assistant Examiner—Nitin Patel
(74) Attorney, Agent, or Firm—Crowell & Moring LLP

(57) ABSTRACT

A method and apparatus for converting an easily memorized and easily implemented sequence of numbers on a telephone keypad of an Internet enabled digital mobile phone into an appropriate and desirable location on the World Wide Web.

24 Claims, 3 Drawing Sheets

GENERALIZED SYSTEM FOR INTERNET AND SERVICES NAVIGATION FROM KEYPAD EQUIPPED INTERNET DEVICES, INCLUDING BROWSER EQUIPPED PHONES

BACKGROUND OF THE INVENTION

1. Field of the Invention

The present invention is addressed to a system for an improved access to the Internet by allowing an easily implemented entry of alphabetic and other characters using telephone-style keypads of an Internet enabled device.

2. Discussion of Background

The availability of alphabetic characters using digital keypads such as shown in FIG. 3, is universally solved by pressing a corresponding numeric digit key successive times until the correct letter is selected. The pressing of another digital key begins the selection process for the alphabetic character corresponding with that key. The universal telephone display has twelve keys contains the numbers 0–9 plus the "#" and "*". Each of the numbers 2–6 and 8 are associated with three separate letters of the alphabet while the numbers 7 and 9 are associated with four separate letters to provide a total 26 characters represented by the eight numbers 2–9. With such a system, in order to enter text, as explained above, it is necessary to press a digital key once for the first letter represented by the digital key and twice for the second letter represented by the digital key and three times for the third letter. As an example, to enter the text "DOG" the following key presses are required:

The availability of alphabetic characters using digital keypads is universally solved by pressing a corresponding numeric digit key successive times until the correct letter is selected. The pressing of another digit key begins the selection process for the alphabetic character corresponding with that key. The universal telephone display has twelve keys contains the number 0–9 plus the "#" and "*". Each of the numbers 2–9 associated with three or four separate letters of the alphabet to provide a total 24 characters represented by the eight numbers 2–9. The letters Q and Z are not represented on all device keypads. With such a system, in order to enter text,as explained above, it is necessary to press a digit key once for the first letter represented by the digit key and twice for the second letter represented by the digit key and three times for the third letter. As an example, to enter the text "DOG" the following key presses are required:

| Key | Alphabetic Display |
|-----|--------------------|
| 3   | D                  |
| 6   | DM                 |
| 6   | DN                 |
| 6   | DO                 |
| 4   | DOG                |

Aside from the difficulty of entering this particular sequence, the problem increases even further when alpha characters in sequence are represented by the same digit key. When this occurs, it is necessary to either pause for a few seconds until the display advances or to press a navigation key to advance the cursor. This is illustrated by the following table of keys which need to be pressed to enter the text "CAT".

| Key   | Alphabetic Display |
|-------|--------------------|
| 2     | A                  |
| 2     | B                  |
| 2     | C                  |
| Pause | C                  |
| 2     | CA                 |
| 8     | CAT                |

Entry of numeric keys from this particular display is accomplished by either pressing the key additional times until the numeric character is displayed or switching the entry mode to numeric in order to enter the digits correctly. Additionally, special characters are accessible depending on the different cell phone manufactures and typically require the switching of keypad entry modes and multiple key presses.

In order to address some of the problems with Internet access from mobile phones, digital phones are being constructed which are "Internet enabled" by the addition of micro-browser technology which is embedded into the device which enables the connection to a specifically configured server typically located at the wireless carrier premises. The emerging Wireless Application Protocol (WAP) is becoming the standard for these type of implementations. These kinds of browsers normally have two modes of Internet navigation. The first mode is a default menu controlled by the wireless carrier which allows navigation and selection by pressing key pad digits corresponding to the menu items. In a second mode of selection known as a "go to Internet", a selection is made which allows the user to enter a Internet standard Uniform Record Locator (URL). In this Internet mode of operation, entry of Internet destinations is substantially identical to a personal computer browser. However, no matter how compatible it is to a personal computer browser, there is still the problem with time consuming and difficult entry of URLs.

For example, a typical URL must be addressed according to the formatted pages appropriate for display through a WAP browser as for example:

HTTPS://WWW.PHONESERVER.COM:443/index.hdml

The sequence which would be necessary to enter this URL from a telephone keypad would require between 75 and 100 key presses along with several pauses and key pad entry mode changes.

One aid in the execution of the above URL is an auto-completion of the URL addresses. This approach takes advantage of the fact that the majority of URL's begin with "WWW" and end with ".com". Therefore, this auto-completion feature allows for entry of only the word "phoneserver" with completion of the rest of the URL by insertion of the "WWW" and the ".com"

Once the auto-completed address is used, the phone user would typically be routed to the standard web server for a particular organization. This web server is set up to communicate with PC based browsers and will not be able to support the customized navigation required for an effective user experience on their based browser.

Even with all of these changes with respect to addressing the complexity of entering Internet URLs, the largest single obstacle to effect a navigation of the Internet from mobile phones is a difficulty of typing out words using a wireless phone key pad. This is even more difficult in changing light conditions or while in motion which has become a particular problem even for regular telephone to telephone dialing on mobile phones. That is, the problems of safe driving have come to the forefront with respect to not only conversing over the telephones but the actual dialing of a phone number.

Accordingly, there is a need for ease of connection between a mobile phone Internet based system and the Internet which addresses the problem of entering alphabetic characters in a telephone keypad.

SUMMARY OF THE INVENTION

It is an object of the present invention to provide mobile phone users with convenient and easy access to desired addresses on the Internet by using easily recognizable and accessible sequences of keys. It is a further object of the present invention to provide ease of access through the utilization of sequences of letters which correspond to the first letter represented by a keypad key.

These objects are attained by a system which allows the selection of sequences of letters which are very easily entered from a keypad in order to navigate to a particular Internet destination wherein this simple sequence of numbers is recognized by a registered domain name and is affiliated with a specified host that can perform rerouting of traffic from a Web server to provide instruction as to what Internet protocol (IP) address to use when routing traffic for servers in this domain.

The system features the development of software which recognizes a request originating from a phone base browser and uses standard Internet protocols to redirect the user session to the appropriate server page for the content. This approach can be extended by having this software automatically detect the source network (wireless carrier) and the device type and provide automatic routing to different application or different servers based on the network, device or security type required for the service (e.g. HTTP: vs. HTTPS:).

It is a further implementation of the present invention to add features to the web server routing software previously described so that individual mapping commands for a variety of Internet destinations can be managed by a consumer.

The Web server rerouting application of the present invention can be configured by the user on the phone or by the user from a personal computer web browser in order to provide a much fuller integration of function including entry of complex key presses to Internet URL mapping through a full keyboard instead of just a phone keyboard.

The Web server rerouting of the present invention can be accessed from multiple channels including one or more different phones or different networks or PC web browsers, or the routing can also be integrated with other application servers, such as call center or location detection servers. This allows for a routing of transactions or services to be dynamically updated based on user location, time-of-day or changes posted through a PC web site or a call center.

Another object of the present invention is to provide letters corresponding to the digits which can be used as a "Keyword" that can be promoted by content providers and be consistent across multiple carriers.

It is a still further object of the present invention to provide that a new high level domain such as WAP could be created instead of .COM in order to be used to provide the related services.

Other objects, advantages and novel features of the present invention will become apparent from the following detailed description of the invention when considered in conjunction with the accompanying drawings.

DETAILED DESCRIPTION OF THE PREFERRED EMBODIMENT

The implementation of the key sequencing is based on the manner in which keys are "translated" to alphabetical characters when entering easily remembered sequences on the keyboard. Letter combinations which are very easily entered from a keypad are generated through the selection of sequences of letters which correspond to the first letter represented by a keyboard key. The "word" created by this sequence is not meaningful, in and of itself. However, the importance lies not in the words themselves but the sequence in the key navigation.

Figure 3:
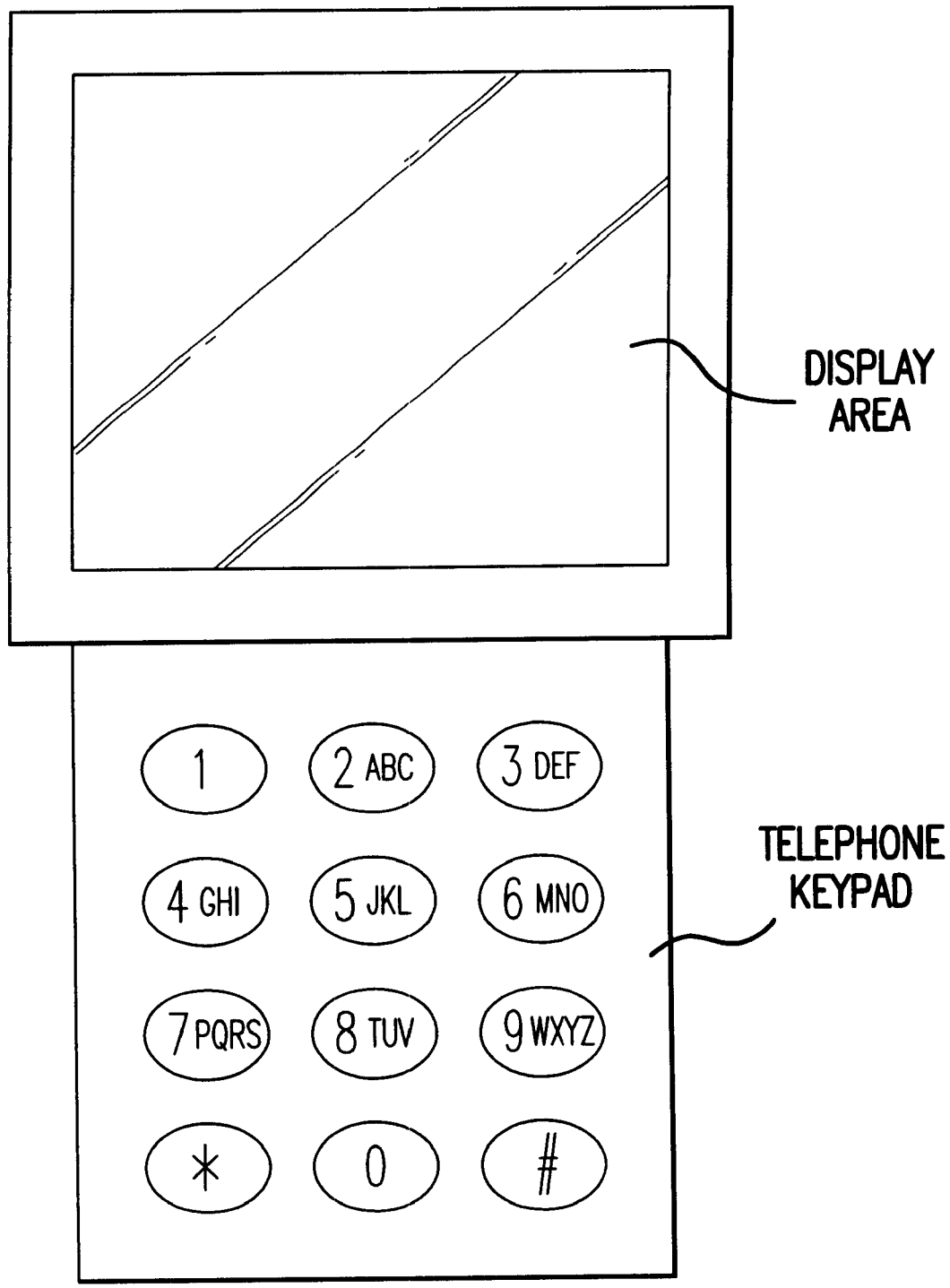
FIG. 3 is a schematic of a mobile phone having a display area and a standard telephone keypad.

As an example, if the key sequence 78987 of the keypad of FIG. 3 is used to navigate to a particular internet destination, it can be appreciated that they are simply the sequence of keys along the bottom of the keypad from 7 to 9 and back. These and other similar arrangements are easy to remember and more importantly easy to navigate even if the user is not looking at the keypad. The result of the above mentioned keypad sequence is illustrated as follows:

| Key | Alphabetic Display |
|-----|--------------------|
| 7   | P                  |
| 8   | PT                 |
| 9   | PTW                |
| 8   | PTWT               |
| 7   | PTWTP              |

The character sequence of "PTWTP", when relying on the auto-complete feature of the browser is translated into "WWW.PTWP.COM".

By using a sequence such as PTWTP, the address is directed to a specified host that performs rerouting of traffic from web servers. As an example, the PTWTP.COM would be registered to point to specific domain name servers (DNS) which, in turn provide the instructions as to what Internet Protocol (IP) address to use when routing traffic for servers in this domain.

Figure 1:
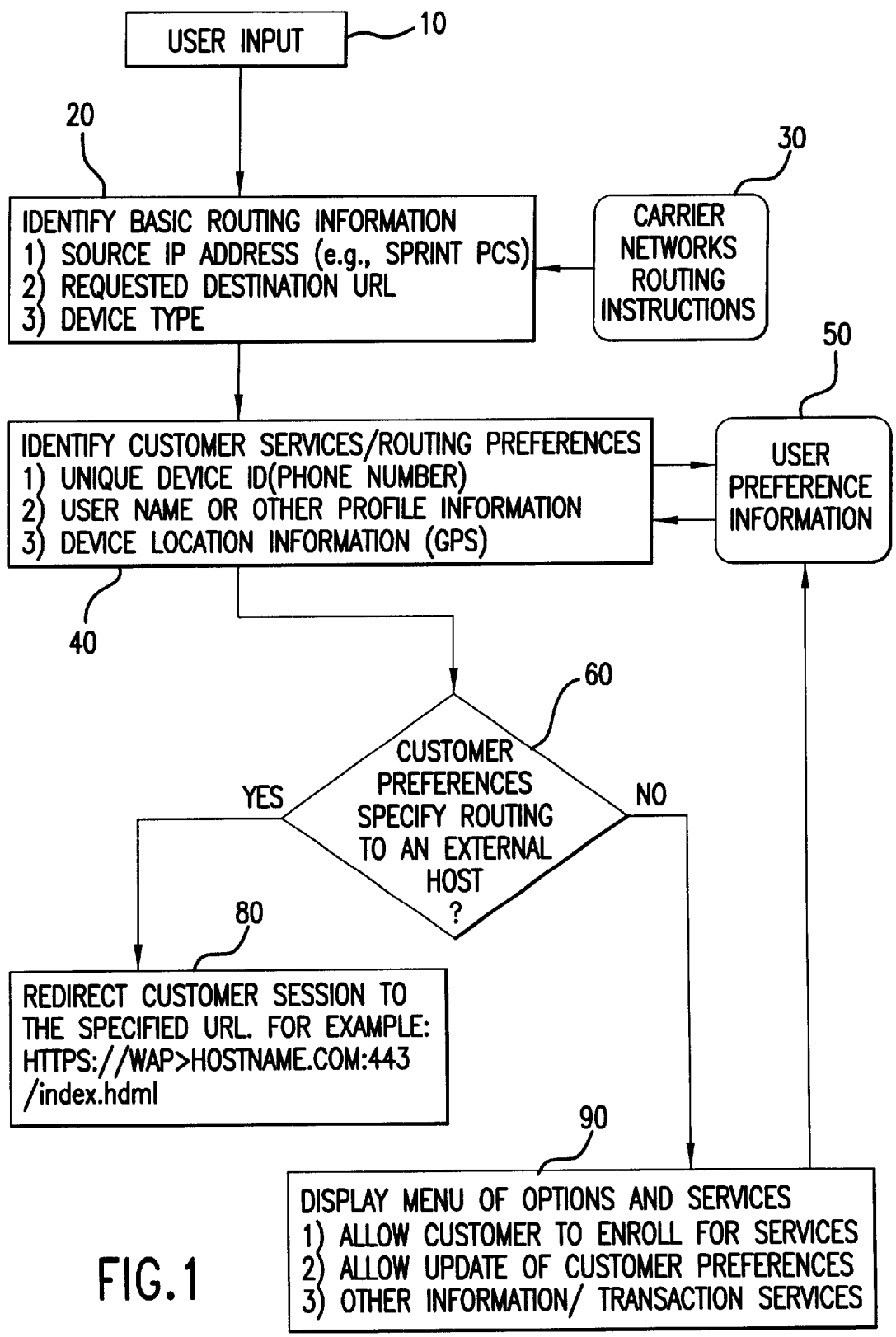
FIG. 1 is a flow chart illustrating the rerouting of traffic from a cell phone as a result of a particular key sequencing.

FIG. 1 is a flow chart illustrating an example of a typical flow of data and information in order for a user 10 to receive, on the display of his mobile phone, the information illustrated in 80 or 90 at the bottom of FIG. 1.

The user input 10 constitutes a particular URL such as PTWTP.COM. The system, at block 20, searches for and identifies the source of the IP address (wireless carrier e.g. Sprint PCS) and then identifies the requested destination URL (PTWTP.COM) as well as the type of device using the wireless application protocol (WAP). It can also identify language preference. Also input to block 20 are the routing instructions from all of the wireless carriers to be matched up with the particular source IP address.

The remaining rerouting shown in block 40 is based upon preference information from not only the user but also the "customer". In this context, the customer is the owner or exclusive licensee of the domain names entered by the user. In the specific example, the customer is the owner of the domain name "PTWTP.com". There are thus three entities involved in the flow chart. There is the user, the carrier network, and the customer/owner. It is possible for one of the carrier networks to be the owner but the user is generally an individual having a mobile phone with a particular carrier network and having no relationship to the "customer". Nevertheless, in the sequence of events, at the block 40, the owner or customer services/routing preferences are determined and a unique device identification is detected such as the phone number of the user. As indicated in block 40, data is exchanged with the user preference information 50. Subsequently at stage 60 the customer preferences specify whether or not to route to an external host. If the customer (owner) has specified that the routing from this particular requested URL is to go to an external host, the customer session is directed to the specific URL as indicated at item 80 wherein the URL is identified by "hostname". On the other hand, if the customer (owner) does not specify the routing to an external host, the user receives the display 90 which may list a menu of options and services which allow the update of user preferences or other information services. This update of information provided by the user is supplied to the user preference information storage unit 50. The display 90 can also provide other information or transaction services depending upon the customer (owner) specifications.

In order to more fully grasp the nature of the possibilities with the flow of information in the manner described in FIG. 1, it is to be understood that the customer or owner is able to provide a service to the user in return for the customer directing the user to a specified site.

For example, the system may be used to provide location information to a user on the road wherein, in a particular locality, the sequencing of PTWTP in the manner indicated above provides quick access to restaurants in a particular area in which the user is driving. In addition to this information, which is a customer provided service to the user, the site containing the information may also include advertising either for the customer or for clients of the customer. In this manner, a customer who owns the registered domain PTWTP is able to redirect calls made to that domain address to provide both a requested information to the user and to customize information received by the user. Furthermore, it is possible to provide a service to the user which is based upon the users preference as provided in the user preference information 50 gathered, for example, from the display menu of options at 90 which allow the user to become registered and to update their preferences.

In addition to key sequencing, letters corresponding to the digits can be used as a "Keyword" that can be promoted by content providers and be consistent across multiple carriers. For example, an organization uses the domain name "WMARK.COM" which could be promoted as "WMARK" with the wireless keyword relying on autocomplete of the ".COM".

In yet another aspect, a new high level domain such as .WAP could be created instead of .COM in order to be used to provide all of the above described wireless application services.

Figure 2:
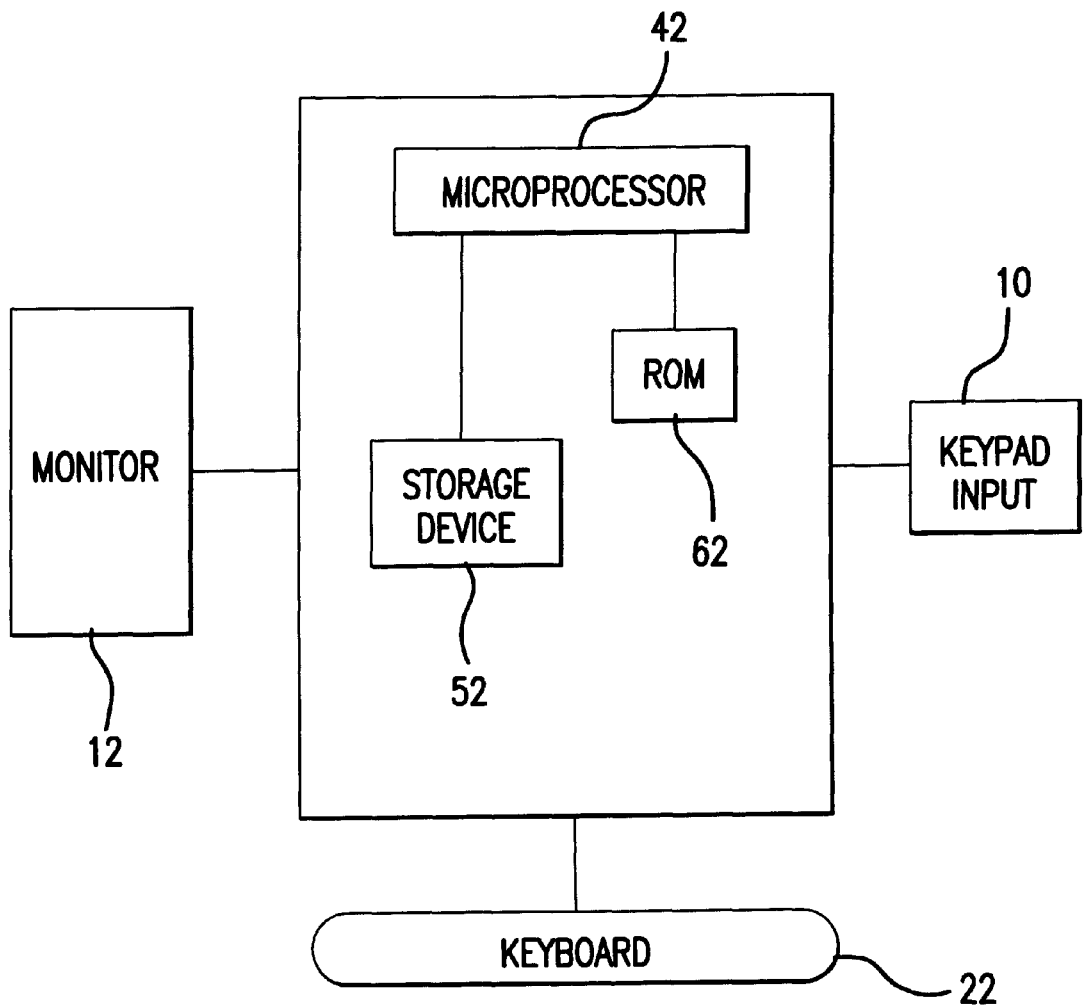
FIG. 2 is a schematic of a computer server system containing a software for performing the rerouting of traffic from a user.

FIG. 2 is a schematic illustration of a server system containing a storage medium including software for accomplishing the rerouting illustrated in FIG. 1. The computer/server 32, which receives the user input 10, has microprocessor 42, ROM 62 and a storage device 52 in a form of a CD, CD-ROM, floppy disk or other media. A keyboard 22 and a monitor 12 complete the system.

The foregoing disclosure has been set forth merely to illustrate the invention and is not intended to be limiting. Since modifications of the disclosed embodiments incorporating the spirit and substance of the invention may occur to persons: skilled in the art, the invention should be construed to include everything within the scope of the appended claims and equivalents thereof.

What is claimed is:

1. A method of providing user access to desired addresses on the World Wide Web using an Internet enabled device with a keypad having a standard telephone keypad configuration, said method comprising the steps of:
   detecting a selection of a particular series of digits with each digit being one of a group from 2 to 9 on said keypad wherein consecutive ones of said series of digits are different numbers;
   converting said series of digits to a series of letters;
   converting said series of letters to a internet protocol web address by addition of a prefix and a suffix to form an Internet standard Uniform Record Locator;
   redirecting the address from a wireless application protocol to a specific predetermined appropriate server page wherein said predetermined appropriate server page is determined as a function of at least one of a previously defined user preference and a customer specification.

2. The method according to claim 1, wherein each one of said series of letters correspond to a first letter selected from a set of three letters associated with each of said series of digits on said standard telephone keyboard.

3. The method according to claim 1, wherein said step of redirecting the address from an-application includes the step of identifying the source of the address and the phone number of the mobile phone.

4. The method according to claim 1, wherein the first and last digit of said selected series of digits are the same digit.

5. Method according to claim 1, wherein consecutive digits of said selected series of digits are adjacent ones of keys on said standard key pad.

6. The method according to claim 1, wherein the suffix is a high level domain designating wireless application protocol.

7. The method of claim 1, wherein said device is a mobile phone.

8. A system for converting digital entries into onto a device with a keyboard having a standard telephone keypad configuration into an Internet standard Uniform Record Locator in order to provide a desired Internet protocol address, said system comprising:
   a first means for detecting a selected group of inputs to said keypad wherein each input of said selected group is one of a series of numerical digits selected from the group of 2 to 9 and wherein adjacent ones in time of said series of digits are different numbers;
   a second means responsive to said selected group to convert said group to an alphabetic representation defined by said standard telephone keypad as a first letter selected from a set of three or four letters or the digit or multiple special characters associated with each number from 2 to 9;
   a third means for adding a prefix and suffix of characters to said alphabetic representation in order to provide an Internet standard Uniform Record Locator;

a fourth means responsive to said Uniform Record Locator to direct said user to a specified host for performing predetermined routing.

9. The system according to claim 8, wherein said adjacent ones in time of said series of digits are input to said keypad from adjacently positioned keys.

10. The system according to claim 8, wherein said fourth means include a means for determining the address of a carrier network of said digital mobile phone and a means for determining the phone number of said mobile phone.

11. The system according to claim 8, wherein the suffix is a high level domain designating wireless application protocol.

12. The system of claim 8, wherein said device is a mobile phone.

13. A method of converting numerical input on a digital device with a keypad having a standard telephone keypad configuration into an Internet standard Uniform Record Locator address, comprising the steps of:

recognizing one of a plurality of series of numbers input in said keypad;

converting said one recognized series of numbers into an alphabetic characterization wherein each letter of said alphabetic characterization is selected from a group of letters including A, D, G, J, M, P, T, and W;

augmenting said selected and converted alphabetic characters with a preselected prefix of characters and a preselected suffix of characters in order to provide said standard Uniform Record Locator address.

14. The method according to claim 13, wherein each number of said recognized series of numbers input into said keypad is selected from a group of numbers between 2 and 9.

15. The method according to claim 13, wherein consecutive ones of said recognized series of numbers input in said keypad are input by pressing adjacent ones of said keys containing numbers 2 to 9.

16. The method according to claim 13, wherein the suffix of characters is a high level domain designating wireless application protocol.

17. A computer program product for use with a digital device, said computer program product comprising:

a computer usable medium having computer readable program code means embodied in said medium for causing the assignment of one of a plurality of groups of numerical sequences input into a standard telephone type keypad of said digital device to an Internet standard Uniform Record Locator address, said computer program product having:

computer readable program code means for causing a computer to recognize numerical inputs into said standard keypad as one of said groups of sequences when said numerical inputs consists of a series of numbers selected from the digits 2 to 9 and when adjacent ones of said numbers are different;

second computer readable program code means for causing said computer to convert said selected group of numbers into an alphabetic representation corresponding to a first one of a group of three letters associated with a corresponding number on said keypad;

third computer readable program code means for causing said computer to provide a predetermined prefix and a predetermined suffix to said alphabetic configuration in order to provide an Internet standard Uniform Record Locator address;

computer readable program code means for causing said computer to detect a source network associated with said digital device and to automatically route a user of said digital phone to predetermined application wherein said predetermined applications are a function of said input group of numbers and a predetermined customized preference of at least one of said user and a customer.

18. The computer program product according to claim 17, wherein said recognized groups of sequences result from activation of an easily implemented sequence of keys.

19. The computer program product according to claim 17, wherein said predetermined customize preference of a customer is the redirecting of said uniform record locator address to a specified different uniform record locator address.

20. The computer program product according to claim 17, wherein the predetermined suffix is a high level domain designating wireless application protocol.

21. The computer program product according to claim 17, wherein said device is a mobile phone.

22. A program storage device readable by a machine tangibly embodying a program of instruction executable by the machine to perform method steps for directing a user input sequence of numbers in a digital device having a keypad with a standard telephone keypad configuration to a desired location on the World Wide Web, said method steps comprising:

detecting a particular series of numerical sequence entered by said user on said keypad wherein said particular sequence include a series of numbers selected from the group of 2 to 9 wherein adjacent numbers of said series are different;

converting said particular series into an alphabetic representation and modifying said alphabetic representation to provide a standard Uniform Record Locator address;

detecting a source network for the operation of said digital device;

identifying predetermined preference information for at least one of said user and a customer;

routing said digital mobile phone to a location determined by said identified preference.

23. The program storage device acclaimed to claim 20, wherein said alphabetic representation consists of letters selected from the group of A, D, G, J, M, P, T and W.

24. The program storing device according to claim 22, wherein said digital device is a mobile phone.

* * * * *